United States Patent [19]
Procop et al.

[11] 3,871,754
[45] Mar. 18, 1975

[54] FILM PROJECTOR AND CARTRIDGE APPARATUS

[75] Inventors: Alex J. Procop; Ace Boultinghouse, both of Northridge, Calif.

[73] Assignee: Target Systems Corporation, Northridge, Calif.

[22] Filed: Aug. 22, 1973

[21] Appl. No.: 390,390

[52] U.S. Cl. ............... 352/29, 352/72, 352/78 R, 226/90, 360/3
[51] Int. Cl. ............................................ G03b 31/02
[58] Field of Search ............... 352/29, 72, 78, 27; 360/93, 94, 95, 96, 130, 3; 226/174, 180, 90

[56] References Cited
UNITED STATES PATENTS

| | | | |
|---|---|---|---|
| 3,176,310 | 3/1965 | Finnerty | 352/29 |
| 3,227,508 | 1/1966 | Bavaro | 352/27 |
| 3,244,469 | 4/1966 | Hennessey et al. | 352/14 |
| 3,244,470 | 4/1966 | Hennessey et al. | 352/29 |
| 3,300,270 | 1/1967 | Finnerty | 352/72 X |
| 3,319,858 | 5/1967 | Schober et al. | 226/180 X |
| 3,375,054 | 3/1968 | Hughes | 352/29 |
| 3,549,069 | 12/1970 | Watanabe | 226/90 |
| 3,591,267 | 7/1971 | Kakiuchi | 352/29 |
| 3,672,276 | 6/1972 | Erlichman | 352/78 R |
| 3,733,119 | 5/1973 | Catalano et al. | 352/78 R |
| 3,756,714 | 9/1973 | Caraway | 352/27 |

Primary Examiner—Richard L. Moses
Assistant Examiner—Alan Mathews
Attorney, Agent, or Firm—Wood, Herron & Evans

[57] ABSTRACT

A cartridge loaded film projector includes film driving and sound pickup components and apparatus for automatically engaging and positioning the film with respect to these components when a cartridge is inserted into the projector. A pressure roller and pressure pad are mounted within the projector on a pivotably mounted frame. The frame is normally biased out of the cartridge's path within the projector but an actuating arm attached to the frame extends into the path. When a cartridge is inserted along the path, it engages the arm and thereby pivots the frame and thus the roller and pad to engage the film and position it against the projector's film driving and sound pickup components. The cartridge holds the frame in position while inserted, but the frame automatically returns the roller and pad to inoperable positions upon cartridge removal. The projector and all cartridges are constructed so that the cartridges may be varied in size.

27 Claims, 6 Drawing Figures

FILM PROJECTOR AND CARTRIDGE APPARATUS

This invention relates to film projectors and cartridges and more particularly to apparatus which automatically engages and positions the film for driving and sound pickup when the cartridge is inserted into the projector.

Film cartridges containing endless film bands have been in use with projectors and the like for some time. Such cartridges normally include a film strip disposed along a predetermined path and cartridge openings through which the film can be engaged by project components for projection, sound pickup and film advance operations.

These cartridges offer many advantages including the provision of an integral unit which is insertable into a projector such that it is unnecessary to directly handle the film for threading and the like, as is generally required with the typical reel-to-reel system. The use of such cartridges, however, has required redesign of the film drive, projection and sound pickup apparatus since the films are not manually threaded therethrough. Particularly, it is necessary to provide projector components which cooperate with the cartridge and which positively engage the film to perform the projection, sound pickup and film drive operations.

One such system is shown in U.S. Pat. No. 3,244,470. In this patent, the film cartridge is provided with "passive" components guiding and supporting the film. A film pinch roll and pressure arm are mounted on a swinging member within a projector and are manually rotated into a cartridge aperture, after the cartridge is inserted, to press the film against a sound pickup head and against a capstan drive. A mirror is also manually pivoted into the cartridge for reflecting a projected image from the film through an optical system.

The manual movement of film-engaging or projection components into and out of a cartridge path as shown in the cited patent has several disadvantages. For example, if someone relatively unfamiliar with the projector's operation should attempt to force a cartridge into the projector while the pivotable apparatus was not retracted from the cartridge's path, severe damage and jamming could result. The mirror apparatus could be broken or bent by engagement with the cartridge's front area, and the film-engaging components, the cartridge or the film could be bent, broken or otherwise damaged. Additionally, similar damage might result from a forceful attempt to remove the cartridge before the projector components were retracted from the cartridge's path. Either situation could result in jamming of the projector apparatus requiring skilled repair.

Where projectors are used for commercial display or sales promotions, it is highly desirable that their controls are extremely simple and that the possibilities of damage or jamming be minimized. Continuous, trouble free operation is a must in such circumstances.

Another desirable feature in cartridge type projectors is the ability to accept cartridges of varying sizes. Such a versatile projector enables an operator to utilize relatively short films in smaller cartridges as well as long films in cartridges of larger sizes. Where the projection, sound pickup and film drive components or stations are relatively stationary within a projector, however, it is necessary to present the corresponding and cooperating cartridge components or stations to the projector in the same spatial relationship, regardless of cartridge size. Variations in cartridge size to accommodate films of different length could change the position of a cartridge with respect to the cartridge-receiving cavity in the projector and thereby destroy this required spatial relationship.

It has thus been one object of the invention to provide a cartridge loaded film projector having film engaging components which are automatically moved into and out of operative position in response to cartridge loading and withdrawal, respectively.

A further objective of the invention has been to provide a cartridge loaded film projector having film engaging components which are movable into and out of an operable position within the insertion and withdrawal path of the cartridge, and which are normally biased to a withdrawn position with respect to the path.

A yet further object of the invention has been to provide a film projector adapted to utilize film cartridges of varying sizes and wherein the projection, sound pickup and film drive stations of a cartridge are spatially maintained with respect to corresponding and cooperating projector stations regardless of the size of the cartridge.

Another object of the invention has been to provide a film projector and cartridge apparatus for automatically engaging and positioning the film for driving and sound pickup upon cartridge insertion into the projector.

In a preferred embodiment, a cartridge loaded film projector includes a constant speed film driving capstan, a sound pickup head and film-engaging components which are movable into operable position in direct response to cartridge loading to engage the film and press it against the capstan and the head. The movable film-engaging components are mounted upon a pivotable frame and a cartridge-engaging lever is attached thereto. The lever pivots the components into a cartridge aperture and behind the film when the lever is engaged by a cartridge being loaded into the projector. When the inserted cartridge is operably positioned, it engages a portion of the pivotable frame to maintain the components in engagemment with the film. The pivotable frame is normally biased to an inoperable position and, upon cartridge removal, the frame and components are retracted to such position out of the cartridge's path.

In order to provide for projection, sound pickup and film drive operations, the cartridge is relieved or cut out at selected stations to provide access to the film by the components of the projector. A bottom wall of the cartridge is cut out to provide for access of the movable film-engaging components to a rear side of the film. The front wall of the cartridge is cut out at respective stations to provide for access of the sound pickup head and film driving capstan to the front of the film for sound pickup and film driving. The front wall is also cut out to define a projection station.

A stationary rib is provided within a cartridge-receiving path of the projector and a channel is provided in the cartridge for cooperating with the rib in order to uniformly position the cartridge with respect to the projector when the cartridge is inserted. The projection, sound pickup and film drive cutouts as well as the film-engaging component cutout in the cartridge are all spatially related in a predetermined position to each other and to the cartridge's channel. Correspondingly, the respective projector components and stations are spatially related in predetermined positions with respect to the projector's stationary rib to cooperate with the cartridge's respective stations. The cartridge is thusly always properly positioned within the projector by virtue of the rib and the channel. The size of the cartridge can then be varied to accommodate films of different characteristics, such as length, but the spatial relationship of the corresponding components or stations of the projector and of any cartridge, regardless of size, remains the same due to the cooperation of the projector's positioning rib and the cartridge's rib-receiving channel.

The projector thus has the advantage of efficient automatic film loading and unloading with no possibility of damage due to wrongful film cartridge insertion or withdrawal and without regard to variation in cartridge size.

These and other advantages will become readily apparent from the following detailed description of a preferred embodiment and drawings in which.

Figure 1:
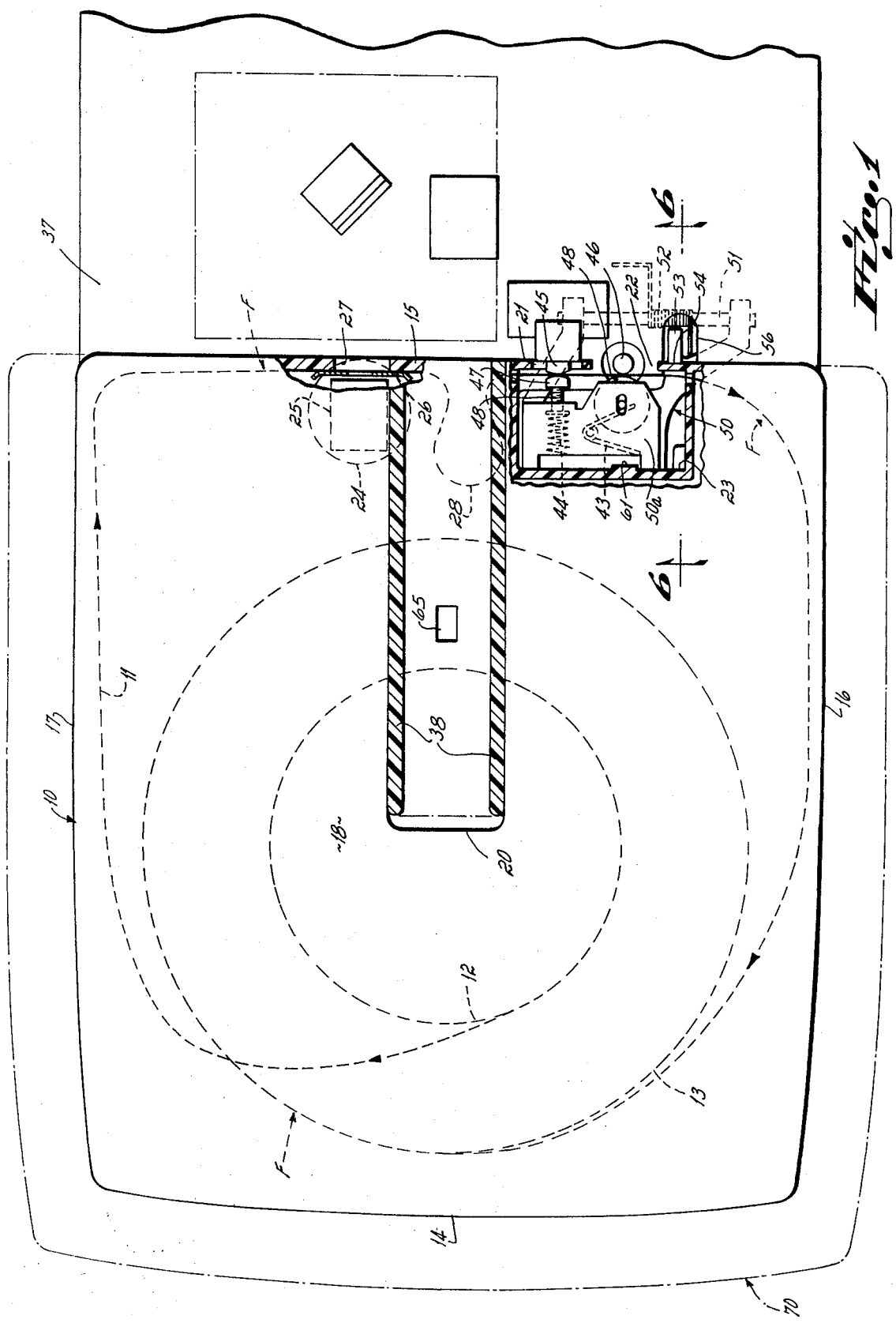
FIG. 1 is a plan view of a cartridge within a projector wherein film-engaging components are positioned for projection, sound pickup and film driving.

Now referring to the drawings, there is shown in FIG. 1 a cartridge 10 containing a film F disposed along a path as indicated by dotted line 11. The film is of the endless band type and includes one or more sound tracks preferably of the magnetic type. The film is disposed to form a film supply roll comprising a number of film convolutions. In operation, the film is removed from the roll from an interior convolution as at 12 and is taken up by the roll onto an outer convolution as at 13. The roll is supported by a flat plate (not shown) which is rotatable with respect to the cartridge. Various guides, rollers and integral projections of the cartridge body position support the film F along its path 11.

The cartridge includes a rear wall 14, a forward wall 15, side walls 16 and 17, an upper wall 18 and a lower wall 19. A longitudinal channel 20 is provided within the top wall 18 of the cartridge and extends from front wall 15 toward rear wall 14.

Figure 2:
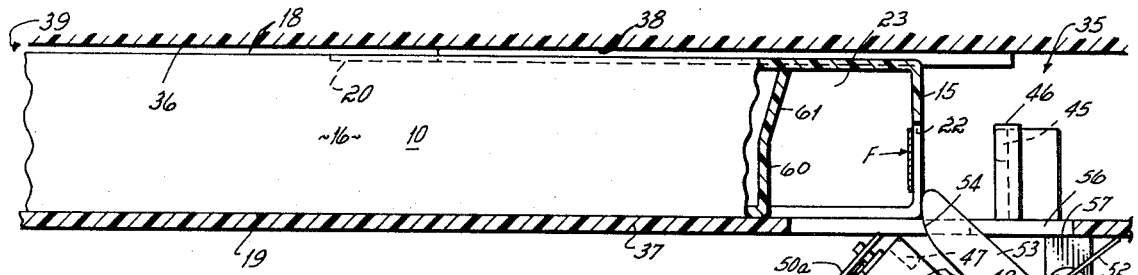
FIGS. 2-5 are cross-sectional views showing a progressive insertion of the film cartridge into a projector and cartridge-actuated film-engaging members.
Figure 3:
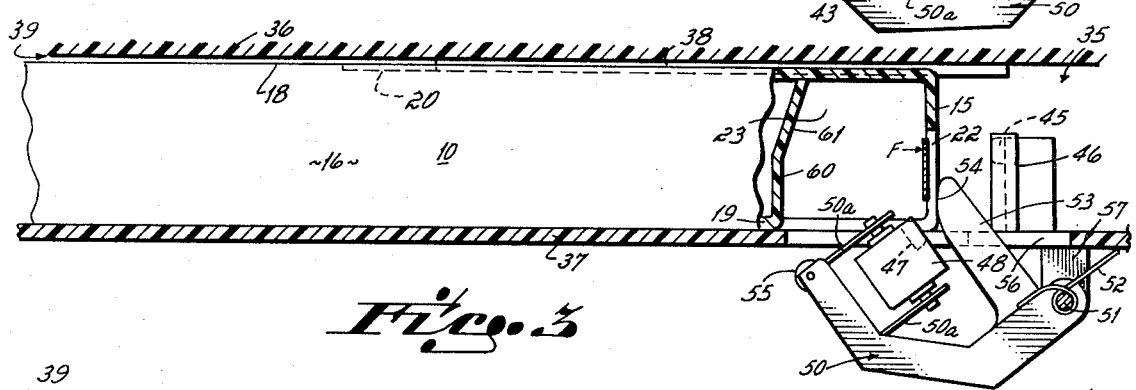

As can be seen by referring to FIG. 2 also, the forward wall 15 of the cartridge is cut out to define sound pickup and film driving stations. An aperture 21 defines a sound pickup station and an aperture 22 is located adjacent the aperture 21 and defines a film driving or advance station. The lower wall 19 of the cartridge is cut out as at 23 to provide room for movable film-engaging components, as will be described.

In addition to sound pickup and film driving stations, the cartridge includes a projection station. Aperture 24 is provided in the bottom wall 19 of the cartridge, and a mirror 25 is disposed in the cartridge at an approximate 45° angle with respect to the plane of the bottom wall 19 of the cartridge and in alignment with aperture 24. A spring-loaded pressure plate 26 is located directly behind an aperture 27 in the forward wall 15 of the cartridge and, together with the aperture 27, forms a film projection station. The pressure plate 26 has an aperture corresponding to the size of a frame of the film and through which an image of the frame can be projected. The pressure plate is also provided with an elongated slot over which the film perforations ride and through which a film driving claw can extend. The film is driven by a claw (not shown) through the projection station in an intermittent manner for projection as is known. To project film images, light is projected along a path through aperture 24, and is reflected by the mirror through the pressure plate, the film and aperture 27 toward optical components of the projector.

The cartridge 10 is insertable into a projector (not fully shown) which includes a cartridge-receiving cavity 35 defined in part by a top plate 36 and a bottom plate 37. Plates 36 and 37 can be integral structural members of the projector. Depending from the plate 36 is a cartridge-positioning rib 38. As a cartridge is introduced into the cartridge-receiving cavity at an end 39 thereof, the channel 20 of the cartridge engages the rib 38 and continued forward motion of the cartridge into the cavity rigidly positions the cartridge with respect to the projector and its components. The cavity is oversized to accept cartridges varying in width, due to differences of film length, for example. It is contemplated that the position of the projector rib and the cartridge channel could be modified if desired to accommodate other changes in cartridge configuration or size. Additionally, the cartridge and channel could be dovetailed such that the cartridge is supported in the cavity by virtue of the rib-channel connection alone.

Mounted within the projector and on bottom plate 37 is a sound pickup head 45 and a film drive capstan 46. The sound pickup head 45 may be of any suitable type and the drive capstan 46 is connected to means for driving it at a relatively constant speed so that it is operable to pull the film past the sound pickup head at a relatively uniform velocity.

Film-engaging pressure components 47 and 48 are pivotally mounted to the bottom plate 37 so that is can be moved to engage the film and urge it against sound pickup head 45 and drive capstan 46 respectively. The film-engaging component 47 comprises a film-engaging pad spring loaded by spring 44 via a connecting plunger 49 to press the film against the sound pickup head 45. The film-engaging component 48 is a roller spring loaded by springs 43 (shown only in FIGS. 1 and 2). When in position, the roller engages the film and presses it against the driving capstan 46.

Both pressure components 47 and 48 are mounted in a bracket 50a which is secured to a rotatable or pivotable frame 50. The frame 50 is mounted on a shaft 51 and is urged by a spring 52 in a counterclockwise direction as viewed in FIGS. 2-6. Shaft 51 is secured to bottom plate 37 by way of brackets as at 57. Secured to the frame 50 is a frame actuator lever arm 53 having a curved cartridge-engaging surface 54. An aperture 56 is provided in the projector member 37 to accommodate lever 53. Mounted in an upper end of the rotatable frame 50 is a cartridge-engaging roller 55 comprising in conjunction with said cartridge a positioning means as will be described.

Also provided on the projector but now shown in a spring-loaded arm which extends upwardly into the cartridge-receiving cavity and through an aperture provided in the bottom wall 19 of the cartridge. This arm engages the film to form a loop 28 when the cartridge is inserted into the projector. This loop accommodates the differences in film motion between the projection station where the film is intermittently driven and the sound pickup station through which the film is continuously moved.

In operation, the cartridge is inserted along a path into the cartridge-receiving cavity 35 of a projector. During insertion, the channel 20 of the cartridge engages the depending cartridge-positioning rib 38 and serves to position and direct the cartridge into its operable position.

Figure 4:
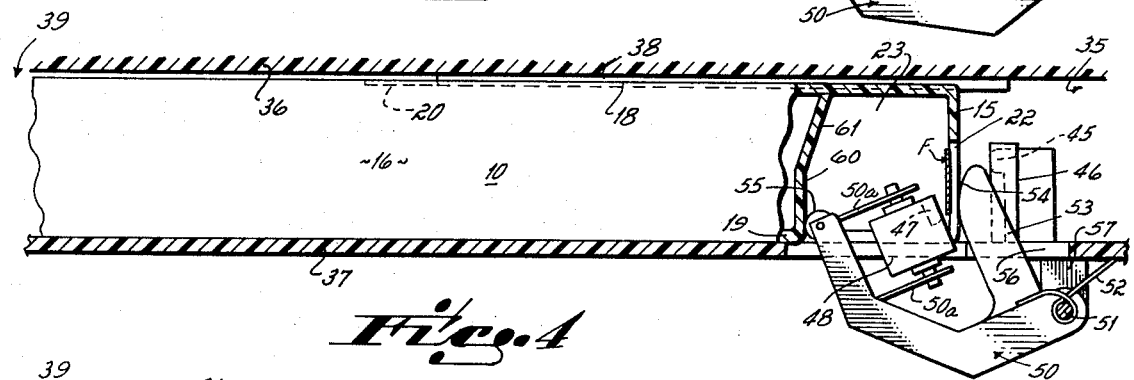

The actuation of the film-engaging pressure components is shown progressively in FIGS. 2-6. When the cavity 35 is empty, the spring 52 biases the rotatable frame and the film-engaging components into a generally inoperable position and out of the path of a cartridge. The curved cartridge-engaging surface 54 of the frame-actuating lever arm 53 extends, however, slightly upward into the path of the cartridge as shown in FIG. 2 where the front wall of an inserted cartridge has just engaged the curved surface 54. Continued forward motion of the cartridge toward an operable position begins to rotate the lever 53 and thus the frame 50 in a clockwise direction. In should be noted that the brackets 50a and the film-engaging components 47 and 48 are mounted on the frame 50 so that they do not extend into the cartridge's path, i.e., above the bottom plate 37, until the cartridge's forward wall 15 has passed beyond the bracket and the components. In FIG. 4, the film-engaging components have just moved upwardly and slightly into the path of the cartridge but behind the film.

Figure 5:
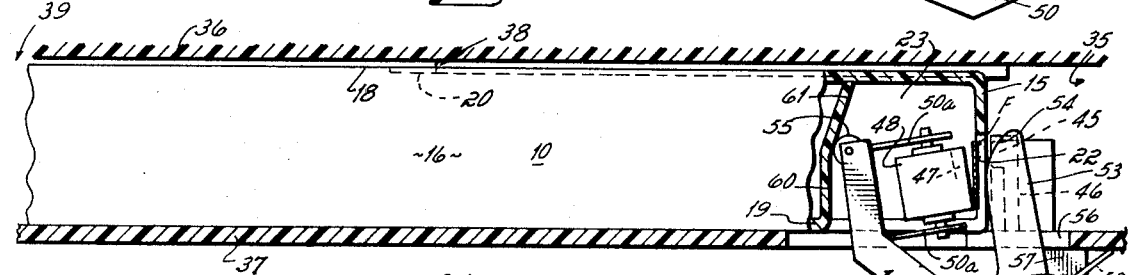

In FIG. 5, the rotatable frame has been moved still further in a clockwise direction. At this point, the roller 55 engages cartridge surface 60 which is provided as an integral portion of the cartridge. This surface has a slightly inclined portion 61. The disposition of pivot shaft 51, the roller 55 on the upper end of the frame 50 and the inclination 61 of the surface 60 is such that continued forward motion of the cartridge will urge the frame 50 (via roller 55 and surface 61) still further in a clockwise direction until the cartridge reaches its operable position as shown in FIG. 6.

Figure 6:
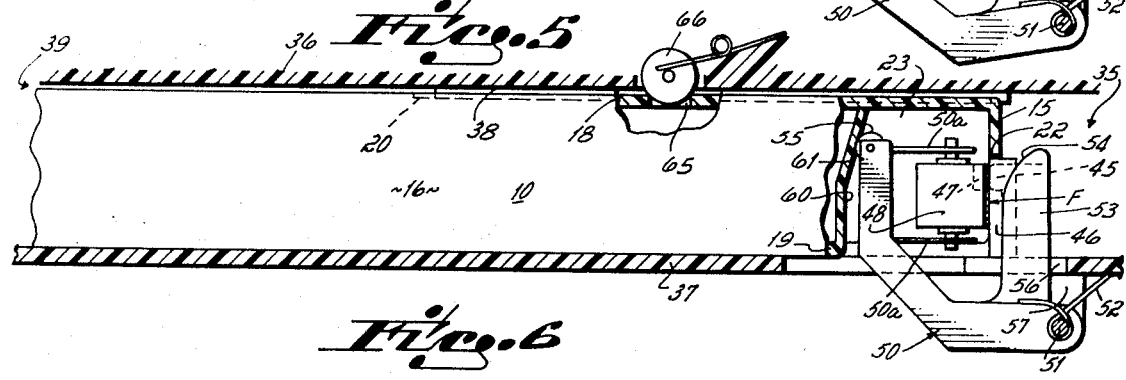
FIG. 6 is a cross-sectional view taken on the line 6—6 of FIG. 1 and shows a cartridge in an operable position within a projector with film-engaging members held in place by the cartridge.

In the operable position of FIG. 6, the film-engaging components 47 and 48 engage the rear side of the film and are biased by their respective springs, as have been described, to urge the film against the sound pickup head 45 and the drive capstan 46, respectively. The positioning means comprising roller 55 and cartridge surface 61 serve to hold the frame 50 and components 47 and 48 in position.

The rotatable frame 50 is biased toward counterclockwise movement by spring 52 and by the compression of the springs 43, 44 associated with the pressure members 47 and 48. This has a tendency to urge a cartridge rearwardly and apparatus is provided to prevent this. The cartridge is held in its operable position via at least one detent or cutout 65 in the top wall 18 of the cartridge, and by a corresponding spring-loaded roller 66 (shown only in FIG. 6) which depend into the cutout in order to hold the cartridge against movement. The detent is strong enough to hold the cartridge in position against these springs but yields when additional force is applied as when the cartridge is removed.

The complete cartridge insertion operation thus includes preliminary engagement with the lever arm 53 of the rotatable frame 50, general clockwise movement of the film-engaging pressure components on the frame into position behind the film, and engagement of an upper portion of the frame 50 (via roller 55) with an integral inclined surface 61 of the cartridge for urging the film-engaging pressure components 47 and 48 against the film and for holding the components in position while the cartridge is maintained in position.

It can be appreciated that the cartridge-positioning structure provides for the use of cartridges of varying sizes. For any cartridge, and regardless of its size, the apertures 21, 22 and 27 defining sound pickup, film drive and projection stations, are all provided in the cartridge front 15 in the same relative position with respect to each other and with respect to the channel 20. Thus, while the cartridge may be manufactured considerably wider and longer, such as shown by the phantom line 70, the frontal structure of the cartridge with respect to the channel 20 remains spatially identical to cartridges of other sizes. Therefore, a cartridge according to the above will always cooperate with corresponding projector apparatus and its corresponding components. It is, of course, understood that the cartridge-receiving cavity 35 may be of such maximum dimensions to accommodate the largest cartridge contemplated for use.

When it is desired to remove the cartridge, its rearward end is merely grasped and the cartridge is retracted from the cavity. Since the rotatable member is biased by the spring 52 in a counterclockwise direction, the roller 52 will tend to roll down the surfaces 61 and 60 and the film-engaging pressure components in the frame 50 will be rotated out of the path of the cartridge as it is withdrawn. The frame 50 and its various elements will remain in the position as shown in FIG. 2 until a new cartridge is inserted. Such operation completely negates the possibility of cartridge damage due to forceful cartridge removal or insertion attempts when the frame 50 and its components are within the cartridge's path.

These and other objects and advantages will become readily apparent to one of ordinary skill in the art without departing from the scope of the invention and applicant intends to be bound only by the appended claims.

I claim:

1. Film projector and sound apparatus of the type utilizing a cartridge containing a film having a sound track, said cartridge being movable into a first operable position within said projector and being withdrawable therefrom, said apparatus comprising, sound pickup means in said projector for picking up sound information from said sound track, film advancing means in said projector for moving said film past said pickup means, film-engaging means for engaging and urging said film into engagement with said sound pickup means and said film advancing means in direct response to movement of said cartridge into said first position, said film-engaging means being retractable away from said film in direct response to withdrawal movement of said cartridge, first cartridge engaging means for moving said film engaging means toward an operative position when said cartridge is moved toward said first position, and second cartridge engaging means for holding said film-engaging means in engagement with said film when said cartridge is in said first position, said second cartridge engaging means being movable into engagement with said cartridge in response to movement of said first cartridge engaging means by said cartridge.

2. Apparatus as in claim 1 wherein said cartridge is movable in a path toward said first position and said film-engaging means is moved into said path when said cartridge is moved toward said first position.

3. Apparatus as in claim 2 wherein said film-engaging means is retracted from said path when said cartridge is withdrawn.

4. Apparatus as in claim 1 wherein said film-engaging means is carried by support means normally biasing said engaging means away from said film.

5. Apparatus as in claim 1 wherein said film-advancing means is a drive capstan and said film-engaging means comprises a pressure pad means for engaging and urging said film against said sound pickup means and a spring-loaded roller for engaging and urging said film against said capstan.

6. Apparatus as in claim 1 wherein said film-engaging means is mounted on a pivoted frame, and wherein said first cartridge engaging means includes an actuating lever on said frame, said lever being disposed in a path of movement of said cartridge for engaging said cartridge and moving said film-engaging means toward said film when said cartridge is moved toward said first position.

7. Film projector and sound apparatus of the type utilizing a cartridge containing a film having a sound track, said cartridge being movable into a first operable position within said projector and being withdrawable therefrom, said apparatus comprising,
sound pickup means in said projector for picking up sound information from said sound track,
film advancing means in said projector for moving said film past said pickup means,
film-engaging means for engaging and urging said film into engagement with said pickup means and said film advancing means in direct response to movement of said cartridge into said first position, said film-engaging means being mounted on a pivoted frame so that said film engaging means is movable away from said film in direct response to withdrawal of said cartridge,
an actuating lever means on said frame, said lever means being disposed in a path of movement of said cartridge for contacting said cartridge and moving said film-engaging means toward said film when said cartridge is moved toward said first position, and
positioning means for holding said film-engaging means against said film when said cartridge is in said first position, said positioning means comprising a cartridge-engaging roller means mounted on said frame and movable into said path upon movement of said cartridge against said lever means, said cartridge when in said first position engaging said roller means to hold said film-engaging means against said film.

8. Apparatus as in claim 7 wherein said frame is normally biased to pivot said film-engaging means away from said film.

9. Apparatus as in claim 8 including means for holding said cartridge in said first position.

10. Apparatus as in claim 1 wherein said projector has a cartridge-receiving cavity and further including cartridge-positioning means at least adjacent said cavity.

11. Apparatus as in claim 10 wherein said cartridge includes a cooperating means for cooperating with said cartridge positioning means and for positioning said cartridge in said chamber.

12. A film-containing cartridge for use in a film projector and sound apparatus of the type having film drive means, sound pickup means, a path for film cartridge insertion, and film-engaging means pivotally mounted to said projector and movable into said path for engaging a film and for positioning it against said sound pickup means and said film drive means, said film-containing cartridge being movable into a first position within the projector and being withdrawable from said first position along said path, said cartridge including
means on said cartridge for engaging said film-engaging means and holding said film-engaging means against said film when said cartridge is in its first position,
said means on said cartridge including a first forward surface means for engaging a first portion of said film engaging means and a second surface means disposed rearwardly of said first surface means, for engaging a second portion of said film-engaging means and for holding said film-engaging means against said film. 21

13. A film-containing cartridge as in claim 12 wherein said projector and sound apparatus includes a stationary cartridge-positioning means in said projector at least adjacent said path, and wherein said cartridge further comprises
means on said cartridge disposed for cooperating with said cartridge positioning means when said cartridge is moved toward said first position and for properly positioning said cartridge with respect to said projector, said sound pickup means, said film drive means and said film-engaging means.

14. A cartridge as in claim 13 wherein said cartridge-positioning means in said projector comprises a rib extending into said path and wherein said cooperating means on said cartridge comprises a channel disposed to receive said rib.

15. Apparatus as in claim 6 wherein said second cartridge engaging means is mounted on said frame and is projected into said path when said lever engages, and is moved by said cartridge, said second cartridge engaging means subsquently pivoting said frame and urging said film-engaging means toward and against said film when said cartridge is moved toward and into said first position.

16. Apparatus as in claim 15 wherein said second cartridge engaging means comprises a roller means mounted on said frame.

17. Apparatus as in claim 11 wherein said cartridge positioning means comprises a rib extending into said cavity and said cooperating means comprises a rib receiving channel.

18. Film projector and sound apparatus of the type utilizing a cartridge containing a film having a sound track, said cartridge being movable along a path into a first operable position within said projector and being withdrawable therefrom, said apparatus comprising, sound pickup means in said projector for picking up sound information from said sound track, film advancing means in said projector for moving said film past said pickup means, film-engaging means for engaging and urging said film into engagement with said sound pickup means and said film advancing means in direct response to movement of said cartridge into said first position, said film-engaging means being retractable away from said film in direct response to withdrawal of said cartridge, movable support means supporting said film-engaging means, said support means having two cartridge engaging means extendable into said path, a first one of said cartridge engaging means being positioned in said path for engaging a cartridge moving toward said first position, and for moving a second one of said cartridge engaging means into said path, said second cartridge engaging means engaging said cartridge and holding said support means in a position so that said film-engaging means is maintained in an operative position when said cartridge is in its first position.

19. Apparatus as in claim 18 wherein said movable support means is normally biased in a direction to withdraw said film-engaging means from said film.

20. A film containing cartridge for use in a projector and sound apparatus of the type including means movable into a cartridge receiving cavity for engaging the film and pressing it respectively against a sound head and a drive capstan in the projector, said cartridge including, two side walls, and a front wall, said front wall including a first surface means for engaging a portion of said film engaging and pressing means and for moving said means into said cavity, and a second surface means disposed rearwardly of said first surface means and between said side walls for engaging another portion of said film engaging and pressing means to move and hold said engaging and pressing means respectively toward and against said film.

21. A cartridge as in claim 20 wherein said second surface means includes a first element in a plane parallel to the plane of said front wall.

22. A cartridge as in claim 21 wherein said second surface means includes a second element extending from said first element, said second element being inclined from said first element toward the plane of said front wall.

23. A cartridge as in claim 22 further including a top wall and a bottom wall and wherein said first element of said second surface means is near said bottom wall and said inclined second element of said surface means is near said top wall.

24. A universal sound-film projection apparatus for projecting various length films contained in cartridges of varying sizes, said projection apparatus including, a cartridge receiving cavity, a sound head station including sound pickup means, a drive capstan station including film advancing means, a projection station adjacent which a film is drawn past a light path for film projection, a single elongated cartridge engaging and positioning means at least adjacent said cavity, each of said stations being disposed in a predetermined spatial relationship with respect to said cartridge engaging and positioning means, said projection apparatus further including, means for engaging and urging said film into operative engagement with said sound pickup means and with said film advancing means, including first cartridge engaging means for moving said film engaging means toward an operative position when said cartridge is inserted into said projection to engage said first cartridge engaging means, and second cartridge engaging means for holding said film-engaging means in engagement with said film when said cartridge is fully inserted within said projection, said second cartridge engaging means being movable into engagement with said cartridge in response to movement of said first cartridge engaging means by said cartridge, and wherein each of said film containing cartridges have stations corresponding to said projection apparatus stations, and including, a sound pickup station, a film drive station, a projection station, and a single elongated means for cooperating with said elongated cartridge engaging and positioning means, each of said cartridge stations being disposed in a predetermined spatial relationship with respect to said cooperating means, said predetermined spatial relationships being selected so that the respective stations of said projection apparatus and of each cartridge are operatively positioned to cooperate with each other when said cooperating means is operatively engaged by said cartridge engaging and positioning means, despite variations in external dimensions of the cartridge.

25. Apparatus as in claim 24 wherein said cartridge engaging and positioning means is a rib extending into said cavity.

26. Apparatus as in claim 25 wherein said means for cooperating with said cartridge engaging and positioning means includes a rib receiving channel in said cartridge.

27. Apparatus as in claim 24 wherein said cartridges have side walls spaced apart at selected predetermined distances to define cartridge widths, said cartridge receiving cavity being wide enough to receive the widest of said cartridges.

* * * * *

UNITED STATES PATENT OFFICE
CERTIFICATE OF CORRECTION

PATENT NO. : 3,871,754
DATED : March 18, 1975
INVENTOR(S) : Alex Procop et al

It is certified that error appears in the above-identified patent and that said Letters Patent are hereby corrected as shown below:

Column 1, line 12, "project" should be --projector--.

Column 4, line 62, "now" should be --not--.

Column 4, line 62, "in" should be --is--.

Column 5, line 23, "In" should be --It--.

Signed and Sealed this twenty-sixth Day of August 1975

[SEAL]

Attest:

RUTH C. MASON
*Attesting Officer*

C. MARSHALL DANN
*Commissioner of Patents and Trademarks*